UNITED STATES PATENT OFFICE.

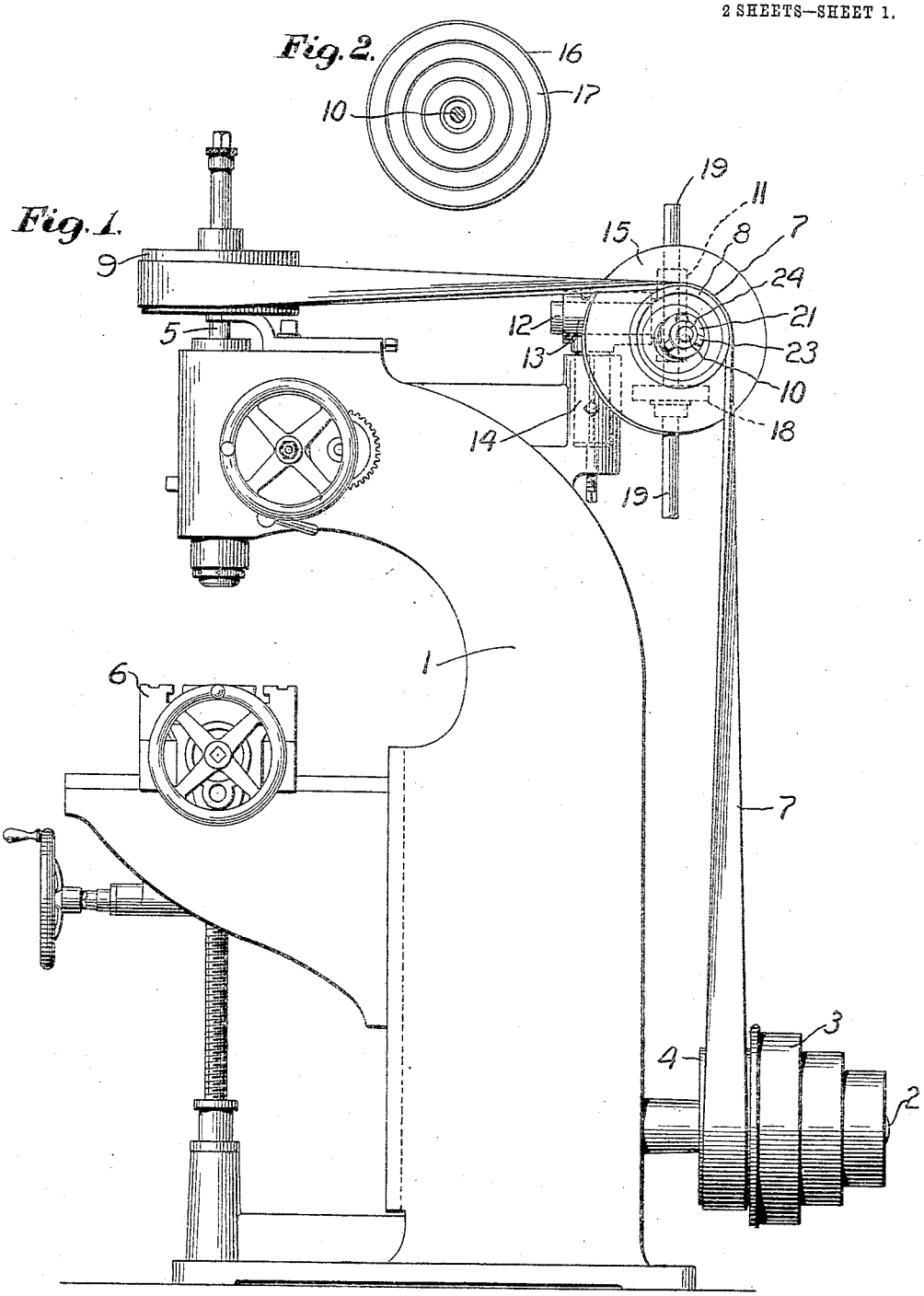

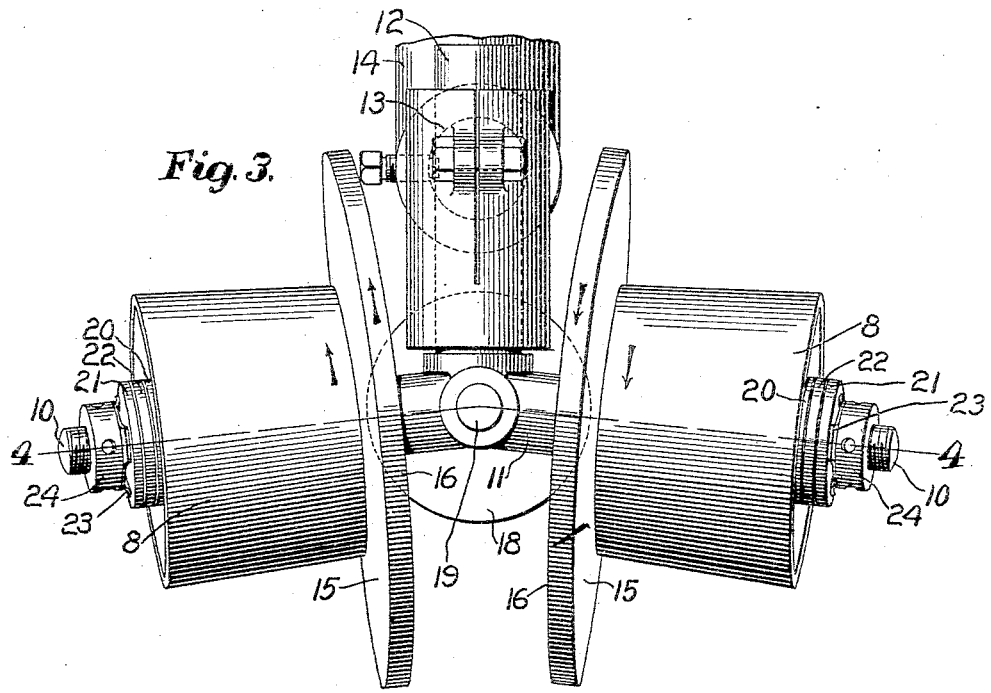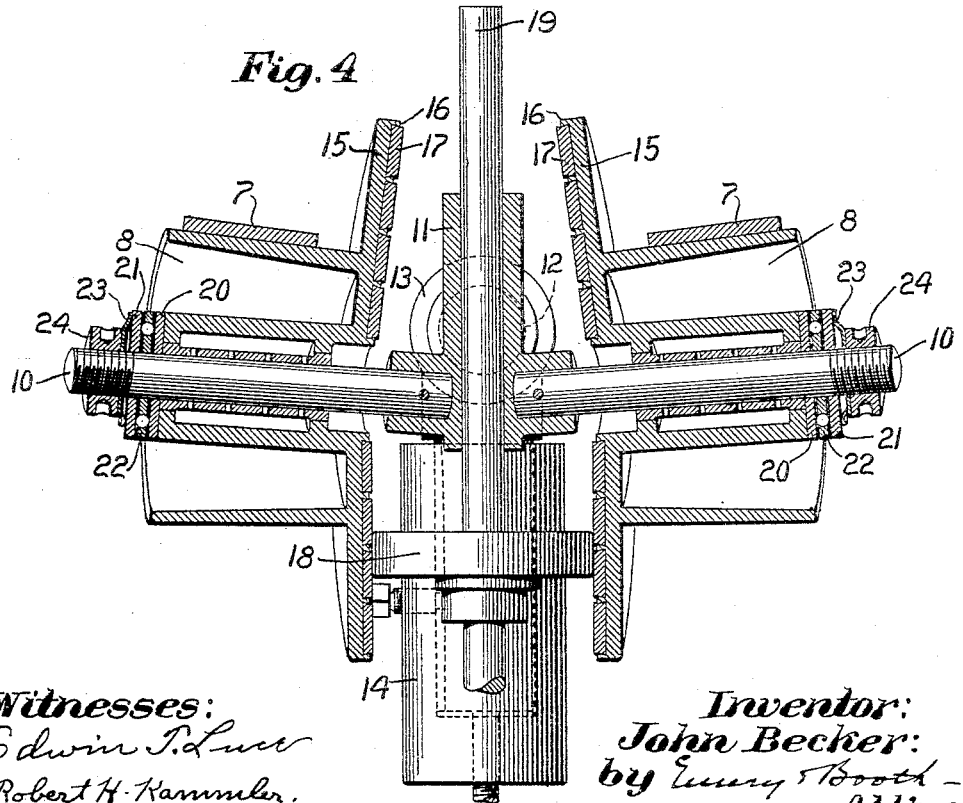

JOHN BECKER, OF HYDE PARK, MASSACHUSETTS, ASSIGNOR TO BECKER MILLING MACHINE COMPANY, OF PORTLAND, MAINE, A CORPORATION OF MAINE.

FRICTION TRANSMISSION MECHANISM.

941,402.     Specification of Letters Patent.     Patented Nov. 30, 1909.

Application filed November 9, 1908. Serial No. 461,704.

*To all whom it may concern:*

Be it known that I, JOHN BECKER, a citizen of the United States, and a resident of Hyde Park, in the county of Norfolk and Commonwealth of Massachusetts, have invented an Improvement in Friction Transmission Mechanism, of which the following description, in connection with the accompanying drawings, is a specification, like numerals on the drawings representing like parts.

This invention aims to produce a novel and improved friction gearing or transmission mechanism particularly adapted for use in connection with a variable gearing for producing varying speeds, and the invention consists in certain features and combinations of elements to be hereinafter more particularly described and pointed out in the claims.

For the purpose of disclosing my invention, I have here illustrated it in connection with a typical vertical milling machine, although it is to be understood that I have so disclosed my invention for illustrative purposes merely, the invention itself being unrestricted in its application and use.

Referring to the drawings: Figure 1 in side elevation, shows in outline a vertical milling machine equipped with friction transmission mechanism illustrating one embodiment of my invention; Fig. 2 is a detail showing in face view one of the friction elements; Fig. 3, on an enlarged scale, shows in top or plan view the transmission mechanism proper; and Fig. 4 is a vertical section on the irregular dotted line 4—4 of Fig. 3.

In the drawings, referring first to Fig. 1, the milling machine 1, of usual or desired type, is employed merely as typifying any machine or use to which my invention is adapted, said machine in the present instance being provided near its base with a horizontal stud 2, upon which are mounted the stepped driving pulleys 3 and the main transmission pulley 4, said machine at or near its upper end having mounted in the overhanging arm a usual vertical spindle 5, to which the tool is secured. The work support is indicated at 6 and is of usual construction, provided, it may be, with any desired means for furnishing it with automatic movement.

The vertical spindle 5 is driven from the main transmission pulley 4 by a belt 7 extended upward and over two lead pulleys 8, thence over to and about a pulley 9 fast on the said spindle.

My present invention has special reference to the mechanism immediately adjacent the lead pulleys 8. These pulleys in themselves are not new herein, they having been heretofore commonly used as mere idlers for leading the belt from the vertical to the horizontal runs thereof, but I have herein utilized said lead pulleys as members of my improved friction transmission mechanism, which I will now more particularly describe. The said lead pulleys 8 (see Fig. 4) are shown as mounted loosely upon the laterally extended studs 10, pitched slightly upward and rearward as shown and secured at their inner adjacent ends in a socketed connection 11. This connection (see Figs. 1 and 3) is provided with a forwardly and horizontally extended arm 12, which is adjustably held in the split socket 13 on the upper end of a vertical arm 14 which, in turn, is vertically adjustable in a portion of the machine frame. The adjustments referred to permit of adjustment of the pulleys 8 to any desired vertical, horizontal, or even angular position.

Referring again to Fig. 4, the lead pulleys 8 at their inner adjacent ends are provided with preferably wide flanges 15, the inner adjacent and disk-like faces of which are shown fitted with concentric ring-like and preferably dovetailed ribs or projections 16, between which are inserted ring-like portions or sections 17 of leather or other material, adapted to furnish suitable friction transmission or friction driving surfaces. The appearance of these ring-like sections, as herein shown, is well illustrated in the face view (Fig. 2). While I prefer to form said ring-like sections 17 continuously, like so many washers of different diameters, it is not essential to my invention that they be so formed for they may be made up of shorter sectional portions; in fact, the sectional area may be otherwise built up than in truly concentric circular or continuous form, so long as the important results to be hereinafter more particularly referred to are attained.

Between the two friction disks 15 (see Fig. 4) and as shown herein, below the studs 10 upon which the pulleys 8 are mounted, is arranged a driven wheel or transmission member 18. This wheel may conveniently be of metal, or with a smooth and preferably cylindrical metal periphery, said wheel in the present instance being fast on a vertical shaft 19, journaled at its upper end in a bearing in the connection 11. The diameter of this driven wheel 18 is such as preferably to extend from one to another of the friction disks 17, which are thereby permitted to bear frictionally upon and at diametrically opposite points of the said friction driven wheel 18.

In practice, with the machine in operation, the driving belt 7 in transmitting motion from the main transmission pulley 4 to the vertical spindle 5 imparts opposite rotation to the lead pulleys 8, thereby constituting said lead pulleys driving pulleys or wheels for the transmission mechanism (Figs. 3 and 4). The friction disks 15 are therefore constituted driving disks or elements of the transmission mechanism, they being rotated in opposite directions as indicated in Fig. 3, and since they bear upon the driven wheel or element 18 at opposite points thereof said driven element and its shaft 19 will be rotated to transmit motion to any desired part or parts, or for any desired purpose, according to the character of the connections with or to the shaft 19.

Obviously, any adjustment of the vertical shaft 19 or of the driven member 18 thereon—whichever construction may be found preferable—by shifting the driven element 18 to a position nearer to or farther from the axis of rotation of the driving disks 15, will vary the speed transmitted to and through the said driven element and its shaft 19, the speed being reduced as the said driven element is moved nearer to the axis of rotation of the driving disks, and increased as it is moved farther therefrom.

It is a well-known mechanical fact that a moving belt passing over the periphery of a pulley, whether such pulley be an idler or a driving pulley, tends constantly to creep toward the highest point or largest diameter of said pulley, consequently, in the construction herein shown (see Figs. 3 and 4) the oppositely moving lines of the belt 7 tend constantly to creep toward the outer higher ends, which may also be ends of larger diameter, of the lead pulleys 8; but because said belt leads from the main transmission pulley 4 at the lower rear end of the machine to a pulley, herein of substantially the same diameter, upon the vertical spindle 5, said belt tends constantly to pursue substantially direct paths from one to the other of said pulleys, hence instead of creeping outwardly and upwardly upon the inclined or pitched surfaces of the pulleys 8, said belt causes the said pulleys, by the action heretofore referred to, to be drawn constantly toward each other. This causes the friction disks 15 to be pressed constantly and frictionally upon the intervening driven wheel or element 18, and, since the effort of the belt 7 to pursue the most direct lines between the driving and driven pulleys 4 and 9 increases with the load being driven thereby, it follows that the greater the load imposed upon the vertical spindle 5 and its pulley 9, and the greater the effort required on the part of the belt 7 to rotate the same, the greater will be the action upon the lead pulleys 8 to draw the same toward each other and to bear frictionally upon the driven wheel 18, consequently the greater will be the power transmitted to and through said driven wheel.

If the vertical, driven shaft 19 be connected with and to operate the work table 6, or any other part of the machine coöperating with the tool upon the vertical spindle 5, it will be apparent that the power transmitted thereto will always be directly proportioned to that required for operating the tool itself. While this automatic pressure of the driving disks 15 upon the intervening driven wheel 18 is thus automatic, increasing and decreasing in its action, and varies herein according as the load imposed upon the belt 7 is increased or decreased, I have provided additional means for creating necessary or desired friction. Referring to Fig. 4, the outer ends of the hubs of the lead pulleys 8 are fitted with washers 20 between which and opposing washers 21 are arranged suitable anti-friction devices such, for instance, as ordinary balls 22, spaced in desired manner.

The outermost washers 21 are acted upon by spider-like springs 23, which in turn are adjusted by nuts 24 threaded upon the outer ends of said studs 10. These nuts, springs and ball bearings constitute convenient means for furnishing positive or manual adjustment of the friction with which the driving disks are held in operative contact with the driven member, and the said manual and automatic adjusting means may be used independently, or the one supplementing the other as herein, as may be desired in any particular case.

It is convenient to employ two driving disks as herein with an interposed single driven member operated thereby, because among other things the opposed action of the driving disks upon opposite sides of the driven member tends to eliminate side friction upon the bearings for the latter, but it is of course apparent that one of the driving disks might be used without the other and with excellent results, and instead of constituting the opposed disks the driving elements and the between-wheel the driven element, the arrangement might be reversed and the wheel 18 in some instances might constitute the driving element and the disk or disks 15 the driven element of the mechanism. I prefer, however, the arrangement shown.

One of the important features of my invention is the manner in which the surfaces of the driving disks 15 are formed. It has been long attempted in the art to provide a friction transmission mechanism comprising a disk-like element and a coöperating element or wheel adjustable across the face thereof, to give or receive motion thereto or therefrom, varying according to the distance of said coöperating element from the axis of rotation of said disk, but no satisfactory surface, so far as I am aware, has ever been found heretofore for the disk face across which the coöperating element is adjustable or with which it coöperates. Leather has probably been used for such disk faces more extensively than any other material, but leather soon stretches and separates from the supporting metal, so as to render the construction practically useless. In fact, it has never been possible, so far as I am aware, to obtain a suitable friction surface that would not stretch or become detached from the metallic support upon which it was originally secured. The construction here shown, however, and particularly illustrated in Figs. 2 and 4, I have found by experience to be substantially permanent and exceedingly durable. While it is not necessary that the ring-like ribs or projections 16 be dovetailed in cross-section as shown, it is nevertheless of advantage because the leather rings arranged in the grooves or recesses between the said ribs are pressed by the frictional action thereon into and to fill the undercut portions of the grooves, thereby to become firmly located therein and secured to the metallic disk 15 that supports the same. Since the direction of travel of contact between the driven wheel 18 and the driving disk 15 is in a substantially circular path around said disk this action, being in the direction of the lengths of the endless rings of leather, has been found not unduly to stretch the same lengthwise nor to loosen the engagement thereof with the supporting material or the intervening ribs; on the contrary such action appears to compact such rings more firmly and closely in position.

Heretofore where leather or other friction faces of substantially extensive area have been employed the continued action of the engaging elements at or near any given position of adjustment has tended to stretch or change the character of the engaging elements at that particular position of adjustment in excess of the stretch or change at any other point or points, causing the surface or surfaces to buckle and separate from its or their supports. It is probable that one of the reasons why my improved friction surface is more permanent than any heretofore devised is that said surface is made up of substantially concentric areas, the action upon each of which is or may be quite independent of all the others, and if any one is acted upon to the exclusion of, or to a greater extent than, the others it will simply be itself compressed, possibly flattened, or subjected to any change that may necessarily result, and adjust itself thereto without affecting in the least the surfaces that are adjacent to or remote therefrom. This segregation of the friction surfaces into generally ring-like areas is, of course, most conveniently and perhaps most effectively and efficiently obtained by its formation in separate and preferably continuous concentric rings, although any other desired construction that will produce the substantial results thereof may be employed, and this whether the sectional portions, of whatever length, be parts of true circles or spiral or othewise non circular.

Because the lead pulley studs 10 are oblique one to another or pitched vertically, the friction disks 15—17 are shown as cupped sufficiently to cause the portions thereof from their axes downward to stand substantially parallel along the vertical lines of contact with the driven wheel 18. While the gearing here shown for driving the disks 15, and at the same time by or as a necessary result of the driving action causing automatic frictional engagement with the driven wheel 18, is in the form of a belt, my invention comprehends in this respect any type of transmission or driving gearing that will produce the same result, in whole or in part. While, also, my invention is particularly adapted for a friction transmission gearing that is variable, it is apparent that as to some features thereof, it is adapted for transmission gears that are not intended to provide variable speeds.

Having described one embodiment of my invention, and without limiting myself thereto, what I claim as new and desire to secure by Letters Patent is:

1. A friction transmission device comprising, in combination, a plurality of frictionally engaging elements one of which is provided with a face containing concentric, surface sections of friction material.

2. A friction transmission device containing, in combination, a plurality of frictionally engaging elements, one of which is provided with a face containing along a radius thereof surface sections of friction material at different distances from its axis of rotation.

3. A friction transmission device containing in combination a plurality of frictionally engaging elements, one of which is provided with a frictional engaging surface containing concentric ring-like areas of friction material.

4. A friction transmission device comprising, in combination, a plurality of frictionally engaging elements, one of which is provided with a face containing surface sections of friction material, sections whereof are at different distances radially from the axis of rotation and in the general direction of their length extend around said axis.

5. A friction transmission device containing, in combination, a plurality of frictional engaging elements, one of which is provided with sections having frictional surfaces and locking means to retain said sections in position.

6. A friction transmission device comprising, in combination, a plurality of frictionally engaging elements, one of which is provided with recesses having undercut walls and friction material arranged in said recesses and held by said walls thereby providing separated friction surface portions.

7. A friction transmission device containing in combination frictionally engaging elements having relatively transverse axes, and frictional driving means whereby the power transmitted through one of said elements tends to thrust the same axially to maintain said elements in frictional engagement.

8. A friction transmission device containing in combination frictionally engaging driving and driven elements having relatively transverse axes, and frictional means to impart motion to the former to drive the latter and automatically thrust the former axially to press the two into frictional engagement.

9. A friction transmission device comprising opposed elements, a common element frictionally engaged therewith, and frictional operating means for one of said elements arranged to tend automatically to maintain and vary its said frictional engagement.

10. A friction transmission device comprising, in combination, frictionally engaging elements having obliquely related axes and means operating to drive one of said elements and through the obliquity of its axis with relation to the axis of the other of said elements press the two into engaging contact.

11. A friction transmission device containing in combination a plurality of disks mounted to rotate about opposed axes oblique one to another, and a coöperating element driven thereby and mounted to rotate about an axis oblique to said disk axes.

12. A friction transmission device comprising, in combination, driving and driven elements, one of which is provided with a face containing along a radius thereof surface sections, the axes of said elements being inclined one to the other.

13. A friction transmission device containing, in combination, a plurality of frictionally engaging elements adjustable one relative to another to obtain varying speeds of transmission, one of said elements having a face containing surface sections of friction material, the sections whereof are at different distances from its axis of rotation.

14. A friction transmission device containing, in combination, a plurality of disks, a face comprising independent surface sections for each of said disks and an intervening coöperating disk, with means to retain the same in frictional engagement.

15. A friction transmission device containing in combination a plurality of sectional-faced disks and an intervening coöperating disk, with driving means arranged automatically to maintain frictional engagement of said disks.

16. A friction transmission device containing, in combination, a plurality of disks each having a face containing surface sections of friction material and an intervening coöperating disk, the axes of rotation of said sectional faced disks being inclined to that of said intervening disk to tend to maintain frictional engagement thereof.

17. A friction transmission device comprising, in combination, frictionally engaging elements having obliquely related axes, means operating to drive one of said elements and through the obliquity of its axis with relation to the other of said elements press the two into engaging contact and additional means to create frictional contact between said elements.

18. A friction transmission device comprising, in combination, a disk having a face containing ring-like, surface sections, a coöperating member in frictional engagement therewith and adjustable toward and from the axis thereof, and means to maintain frictional engagement between said disk and said member.

19. A friction transmission device comprising, in combination, a plurality of frictionally engaging elements, one of which is provided with a cupped face having a sectional frictional transmission surface.

20. A friction transmission device comprising, in combination, a plurality of frictionally engaging elements, a driving pulley forming a part of one of said elements and a transmission belt therefor, said belt and pulley being arranged to cause axial movement of the latter by the former.

21. A friction transmission device comprising, in combination, a plurality of frictionally engaging elements, a driving pulley having a pitched surface and forming a part of one of said elements and a transmission belt coöperating with said pitched surface.

22. A friction transmission device comprising, in combination, a friction element and an element engaging the same having a friction face comprising a plurality of sections adapted simultaneously to engage said other element.

In testimony whereof, I have signed my name to this specification, in the presence of two subscribing witnesses.

JOHN BECKER.

Witnesses:
 EVERETT S. EMERY,
 FREDERICK L. EMERY.